United States Patent
Blanchard et al.

(10) Patent No.: US 10,749,330 B2
(45) Date of Patent: Aug. 18, 2020

(54) DEVICE AND METHOD FOR MONITORING THE ACTIVITY OF PROCESSING UNITS IN AN ELECTRIC TRIP SWITCH

(71) Applicant: Schneider Electric Industries SAS, Rueil Malmaison (FR)

(72) Inventors: Pierre Blanchard, Voreppe (FR); Jean-Baptiste Bernard, Seyssinet-Pariset (FR)

(73) Assignee: Schneider Electric Industries SAS, Rueil Malmaison (FR)

(*) Notice: Subject to any disclaimer, the term of this patent is extended or adjusted under 35 U.S.C. 154(b) by 359 days.

(21) Appl. No.: 15/701,938

(22) Filed: Sep. 12, 2017

(65) Prior Publication Data

US 2018/0076610 A1     Mar. 15, 2018

(30) Foreign Application Priority Data

Sep. 15, 2016 (FR) ...................... 16 58609

(51) Int. Cl.
*H02H 1/00* (2006.01)
*H02H 3/08* (2006.01)
(Continued)

(52) U.S. Cl.
CPC ............ *H02H 1/0007* (2013.01); *H02H 3/04* (2013.01); *H02H 3/044* (2013.01); *H02H 3/046* (2013.01); *H02H 3/05* (2013.01); *H02H 3/08* (2013.01)

(58) Field of Classification Search
CPC ...... G01R 31/327; G01R 31/333; H01C 7/13; H01H 1/0015; H02H 1/00; H02H 1/0007;
(Continued)

(56) References Cited

U.S. PATENT DOCUMENTS

| 4,780,787 A | 10/1988 | Dano et al. |
| 5,335,135 A * | 8/1994 | Kinney .................... H02H 3/04 |
| | | 361/65 |

(Continued)

FOREIGN PATENT DOCUMENTS

| CN | 201315470 | 9/2009 |
| EP | 0 690 597 A1 | 1/1996 |
| FR | 2 602 618 | 2/1988 |

OTHER PUBLICATIONS

French Preliminary Search Report dated May 30, 2017 in French Application 16 58609 filed on Sep. 15, 2016 (with English Translation of Categories of Cited Documents and Written Opinion).

*Primary Examiner* — Jared Fureman
*Assistant Examiner* — Nicolas Bellido
(74) *Attorney, Agent, or Firm* — Oblon, McClelland, Maier & Neustadt, L.L.P.

(57) ABSTRACT

A device for monitoring the activity of at least one first and one second processing unit fitted to an electric trip unit, each processing unit including a first activity-indicating circuit sending an activity signal to another processing unit and a monitoring circuit comparing a received activity signal with a reference signal. Each processing unit activates a first tripping circuit and/or an auxiliary output when the received activity signal is different from the reference signal. A circuit-breaker including such a monitoring device and a method for monitoring the operation of an electric trip unit including at least two processing units.

15 Claims, 7 Drawing Sheets

(51) Int. Cl.
*H02H 3/04* (2006.01)
*H02H 3/05* (2006.01)

(58) Field of Classification Search
CPC .......... H02H 11/00; H02H 3/00; H02H 3/027;
H02H 3/04; H02H 3/044; H02H 3/046;
H02H 3/05; H02H 3/08; H02H 3/093;
H02H 3/0935; H02H 3/247; H02H 3/28;
H02H 3/325; H02H 3/353; H02H 3/36;
H02H 5/00; H02H 9/02; H02H 1/0061;
H02H 7/261; Y02E 60/723; Y02E
60/728; Y04S 10/16; Y04S 10/265
See application file for complete search history.

(56) References Cited

U.S. PATENT DOCUMENTS

| | | | | |
|---|---|---|---|---|
| 8,427,794 | B2* | 4/2013 | Dvorak | H02H 1/0015 |
| | | | | 361/42 |
| 9,214,797 | B2* | 12/2015 | Hameed | H02H 1/00 |
| 2006/0193099 | A1 | 8/2006 | Schweitzer, III et al. | |
| 2011/0063766 | A1* | 3/2011 | Kasztenny | H02H 3/30 |
| | | | | 361/63 |
| 2011/0266890 | A1* | 11/2011 | Lorenz | H02H 11/00 |
| | | | | 307/125 |
| 2012/0150492 | A1* | 6/2012 | Gruffaz | H02H 3/0935 |
| | | | | 702/186 |
| 2012/0226453 | A1* | 9/2012 | Williams | H02H 3/083 |
| | | | | 702/58 |
| 2015/0270083 | A1* | 9/2015 | Masseboeuf | H02H 3/04 |
| | | | | 361/93.2 |

* cited by examiner

DEVICE AND METHOD FOR MONITORING THE ACTIVITY OF PROCESSING UNITS IN AN ELECTRIC TRIP SWITCH

TECHNICAL FIELD

The subject of the invention is a device for monitoring the activity of several processing units intended to operate an electric trip unit. The invention pertains also to a circuit-breaker intended to protect an electrical installation equipped with an electric trip unit comprising such an activity monitoring device. The invention pertains also to a method for monitoring the operation of an electric trip unit comprising at least two processing units.

STATE OF THE ART

Very many devices use, for their operation, one or more processing units such as microprocessors, ASICs or specific programmable components. These processing units make it possible to implement complex functionalities, using software or programmable modules. However, it may be that the programme executes uncertain operations in the case of an event or configuration that has not been taken into account in the design. In this case, a device, generally called "watchdog" is provided to detect an anomaly in the activity of these circuits. It operates in parallel to the processing unit and reacts, in the case of detection of an anomaly, for example by forcing a restart of the device or by imposing a switchover of the device to a safety mode.

The document FR 2 602 618 is known that relates to a watchdog monitoring the activity of a microprocessor used to ensure the trip function of a circuit-breaker. The watchdog consists of a monostable circuit reset to zero by pulses generated by the microprocessor. If the microprocessor no longer generates pulses, the monostable generates a reinitialization of the microprocessor initially followed by a trip if the microprocessor is still not operating correctly. This very simple device is well suited to a configuration comprising a single microprocessor.

The document EP 2 466 712 is known that describes a monitoring device capable of checking the functional integrity of a microprocessor assuming safety functions. This device uses input data processed in parallel by the microprocessor to be monitored and by the monitoring device made up of circuits performing logic operations. The result of each of the processing operations is compared and a safety setting is initialized when the results differ. This device is presented as being an interesting economic alternative to the use of a second microprocessor dedicated to monitoring the first microprocessor.

There are however devices that use at least two processing units, each of the processing units being designed to fulfil one or more specific functions: for example, a first microprocessor is optimized to ensure safety functions while a second microprocessor will be able to be intended to perform computations on the basis of measurements performed by means of sensors or processing operations based on events that have occurred in the electrical installation. These devices also require ongoing monitoring of their operation, and this monitoring must not disrupt the tasks executed by each processing unit, or induce any significant extra cost.

SUMMARY OF THE INVENTION

The aim of the invention is a monitoring device and method that make it possible to signal or activate a tripping member in case of detection of an anomaly in the activity of processing units in an electric trip unit.

According to the invention, the monitoring device monitors the activity of at least one first and one second processing units fitted to an electric trip unit, the first processing unit comprising a first activity-indicating circuit sending a first activity signal on a first activity output, the monitoring device being such that:
 the first processing unit further comprises,
  a first input to receive a second activity signal, and
  a first monitoring circuit, connected to the first input, to monitor the activity of the second processing unit, and
 the second processing unit comprises:
  a second input to receive the first activity signal,
  a second activity-indicating circuit sending the second activity signal on a second activity output, and
  a second monitoring circuit, connected to the second input, to monitor the activity of the first processing unit.

Preferentially, the first monitoring circuit compares the second activity signal received on the first input with a first reference signal and activates a first tripping circuit when the second activity signal is different from the first reference signal.

Advantageously, the first tripping circuit has a first control output, connected to a control input of a first control circuit, to activate said first control circuit.

Advantageously, the second monitoring circuit compares the first activity signal received on the second input with a second reference signal and activates an auxiliary output when the first activity signal is different from the second reference signal.

Advantageously, the first activity output is connected to the first control output and the second input is connected to the control input of the first control circuit to receive the first activity signal.

In a particular embodiment a second actuator control circuit is connected in parallel with the first actuator control circuit and the second processing unit comprises a second tripping circuit, connected to the second control circuit, to activate said second control circuit.

Advantageously, the second activity output is connected to the second actuator control circuit.

Preferentially, the second monitoring circuit compares the first activity signal received on the second input with the second reference signal and activates the second tripping circuit when the first activity signal is different from the second reference signal.

Advantageously, the duration of the first activity signal or of the second activity signal is significantly shorter than the duration of the activation signal of the first actuator control circuit or of the second actuator control circuit.

Preferably, the duration of the first activity signal or of the second activity signal is between 1 and 10 μs and the period between two consecutive activity signals is substantially equal to 10 ms.

The invention pertains also to a circuit-breaker intended to protect an electrical installation comprising:
 current sensors delivering a signal representative of the current circulating in current conductors,
 electrical contacts,
 a contact opening mechanism,
 a trip actuator for actuating the contact opening mechanism, and
 an electric trip unit comprising a first processing unit and a second processing unit, said trip switch being connected to the current sensors and to the actuator to supply a trip command as a function of the signal delivered by said current sensors, said trip switch comprising a monitoring device as described previously.

The circuit-breaker is such that, in the electric trip unit:
the first processing unit activates the first tripping circuit when the signal representative of the current circulating in current conductors exceeds a determined overcurrent threshold, and
the second processing unit performs power and/or energy computations.

The invention pertains also to a method for monitoring the activity of at least one first and one second processing units intended to operate an electric trip unit comprising an activity monitoring device as described previously, said method comprising the following steps:
a sending by the first processing unit of the first activity signal,
a reception by the first processing unit of the second activity signal, and, in parallel,
a reception by the second processing unit of the first activity signal,
a sending by the second processing unit of the second activity signal,
a comparison of the second activity signal received by the first processing unit with a first reference signal, and
an activation of the first control output of the actuator when the second activity signal is different from the first reference signal, otherwise a return to the step of sending of the first activity signal.

Advantageously, the method further comprises the following steps:
a comparison of the first activity signal received by the second processing unit with a second reference signal, and
an activation of the auxiliary output when the first activity signal is different from the second reference signal.

Preferentially, the method also comprises a step of activation of the second control output when the first activity signal is different from the second reference signal.

BRIEF DESCRIPTION OF THE DRAWINGS

Other advantages and features will emerge more clearly from the following description of particular embodiments of the invention, given as nonlimiting examples, and represented in the attached drawings in which.

DETAILED DESCRIPTION OF PREFERRED EMBODIMENTS

A processing unit should be understood to be any device making it possible to perform:
measurements of physical quantities such as currents, voltages, temperatures,
computations taking into account these measurements such as computations of effective value, peak value, average value of the physical quantities,
comparisons with thresholds in order to generate information messages or alarms, and
commands for activating mechanical or electromechanical members.

A processing unit can be implemented by means of a microprocessor, or a microcontroller or an ASIC (Application-Specific Integrated Circuit) or even an FPGA (Field-Programmable Gate Array), this list being nonlimiting.

Figure 1:
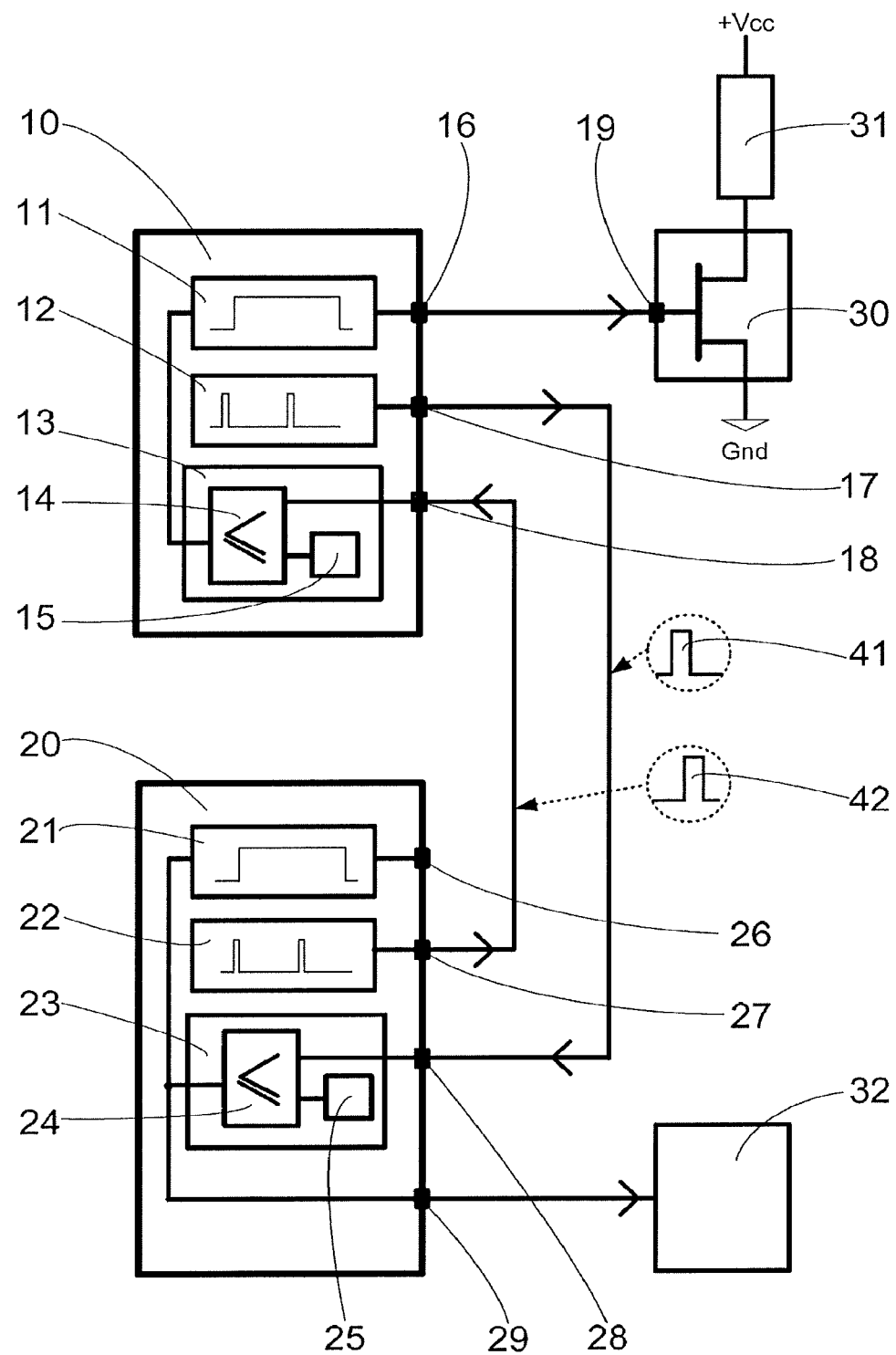
FIG. 1 schematically represents a device for monitoring an electric trip unit comprising two processing units according to a first embodiment of the invention, FIG. 2 schematically represents a variant of the device for monitoring an electric trip unit according to a second embodiment making it possible to monitor links between circuits.

FIG. 1 schematically represents an installation of a monitoring device in an electric trip unit comprising two processing units 10, 20 according to a first embodiment of the invention. A first processing unit 10, preferentially intended to execute electrical network protection functions, comprises a first tripping circuit 11, linked to an input 19 of an actuator control circuit 30 through an output 16. The actuator control circuit 30 preferentially consists of an MOS transistor having a switching function. The actuator control circuit 30 is linked to an actuator 31, the use of which will be detailed in FIG. 5.

The first processing unit 10 also comprises a first activity-indicating circuit 12. Said circuit monitors the operation of the processing unit 10 and sends a first activity signal 41 on a first activity output 17. The activity signal 41 is representative of the activity of the first processing unit 10. Preferentially, the first activity signal 41 is sent periodically, according to a sending period T2 corresponding, for example, to the duration of a complete processing cycle performed by the processing unit. Said first activity signal 41 has a duration T1 representative, for example, of the duration of execution of a specific and essential function that the processing unit has to execute or even represents the embodiment of the transition to a specific task of its programme.

A second processing unit 20 is, for example, intended to execute measurements of electrical parameters of an electrical installation and signal any deviation in relation to set point values. Said second processing unit is preferentially dimensioned to process the measurements, perform computations for example of power, energy, frequency, distortion, harmonic ratio, this list being nonlimiting. As in the first processing unit 10, the second processing unit 20 comprises a second activity-indicating circuit 22. The activity indicator 22 sends a second activity signal 42 on a second activity output 27. The activity signal 42 is representative of the activity of the second processing unit 20. In a way similar to the first activity-indicating circuit, the second activity signal 42 is sent periodically according to a sending period corresponding, for example, to the duration of a complete processing cycle performed by said second processing unit 20. The second activity signal 42 has a duration representative, for example, of the execution time of a specific function mobilizing all the resources of the second processing unit 20.

The first processing unit 10 comprises a first monitoring circuit 13, linked to the second activity-indicating circuit 22 by a link from the second activity output 27. Said link passes through a first input 18 of the first processing unit 10. The second activity signal 42 is thus received by the first monitoring circuit 13. Said first monitoring circuit 13 compares, by means of a comparator 14, the second activity signal 42 received on the first input 18 with a first reference signal 15 and activates the first tripping circuit 11 when the second activity signal 42 is different from the first reference signal 15. The difference in relation to the reference signal 15 preferentially relates to the deviation on the duration of the pulse T1 and/or the deviation on the period T2 between two consecutive signals. For example, a deviation greater than +/−10% on one or other of the parameters will be considered as an anomaly. In the case of an anomaly, the comparator 14 activates the first tripping circuit 11 which, itself, activates the actuator control circuit 30 and the actuator 31. The energy needed to control and operate the actuator 31 is supplied by a power supply delivered between a terminal Vcc and a reference potential Gnd.

Symmetrically, the second processing unit 20 comprises a second monitoring circuit 23, linked to the first activity-indicating circuit 12 by a link from the first activity output 17. Said link passes through a first input 28 of the second processing unit. The first activity signal 41 is thus received by the second monitoring circuit 23. Said second monitoring circuit 23 compares, by means of a comparator 24, the first activity signal 41 received on the second input 28 with a second reference signal 25 and sends an auxiliary control signal on an auxiliary output 29 to which it is linked when the first activity signal 41 is different from the second reference signal 25. In the same way as for the first processing unit, the difference in relation to the reference signal 25 relates preferentially to the deviation on the duration of the pulse and/or the deviation on the period between two consecutive signals. Since the second processing unit preferentially has to execute operations that are more complex but less critical for the operation of the electric trip unit, the tolerable deviation will be able to be greater than in the case of the first processing unit. For example, a deviation greater than +/−30% on one of the duration or period parameters will be considered as an anomaly.

The auxiliary output 29 is connected to a control auxiliary 32. Thus, in case of detection of an anomaly by the second monitoring circuit 23, the control auxiliary 32 will be activated. This auxiliary can be, for example, an external tripping coil of a protection apparatus or a signalling device in the equipment, such as an indicator lamp, or a means of communication to a supervision system, these examples being given as nonlimiting examples.

The second processing unit will, optionally, be able to also comprise a second tripping circuit 21 of which the input is linked to the output of the second monitoring circuit 23, and the output is connected to a second control output 26. The use of the second tripping circuit 21 will be explained later by FIG. 4.

Thus, an operating anomaly of the first processing unit will be detected by the second processing unit and a signalling will be activated by means of the control auxiliary 32. An operating anomaly of the second processing unit will be detected by the first processing unit and the actuator 31 will be activated. The monitoring device of the invention performs a mutual monitoring of each processing unit with great efficiency since the device re-uses the first tripping circuit 11, the first control circuit 30 and the control auxiliary 32 which are existing resources of the electric trip unit and requires only an activity-indicating circuit 12, 22 and a monitoring circuit 13, 23 inside each processing unit.

The functions used to monitor the operation and executed by the circuits 12, 13, 22 and 23 can be produced by means of logic circuits integrated respectively in each processing unit 10, 20, using wired components or programming code executed by a microprocessor or by a programmable logic controller. The link between the first activity output 17 and the second input 28 of the second monitoring circuit 23 or the link between the second activity output 27 and the first input 18 of the first monitoring circuit 13 are represented in the form of wired links in FIGS. 1, 2 and 4 corresponding to a preferential embodiment. Said links can also be produced by optical or electromagnetic means, or even by a combination of several of the technologies cited.

To increase the monitoring level, the verification of the good connection between the first control output 16 and the input 19 of the first actuator control circuit 30 is useful. In effect, said link is preferentially produced by means of a printed circuit and/or wires provided with connectors, subject, like all of the electric trip unit 1, to thermal variations, to mechanical vibrations and subject to ageing. A break of said connection prevents any control of the actuator 31 even if the first processing unit is operating perfectly.

Figure 2:
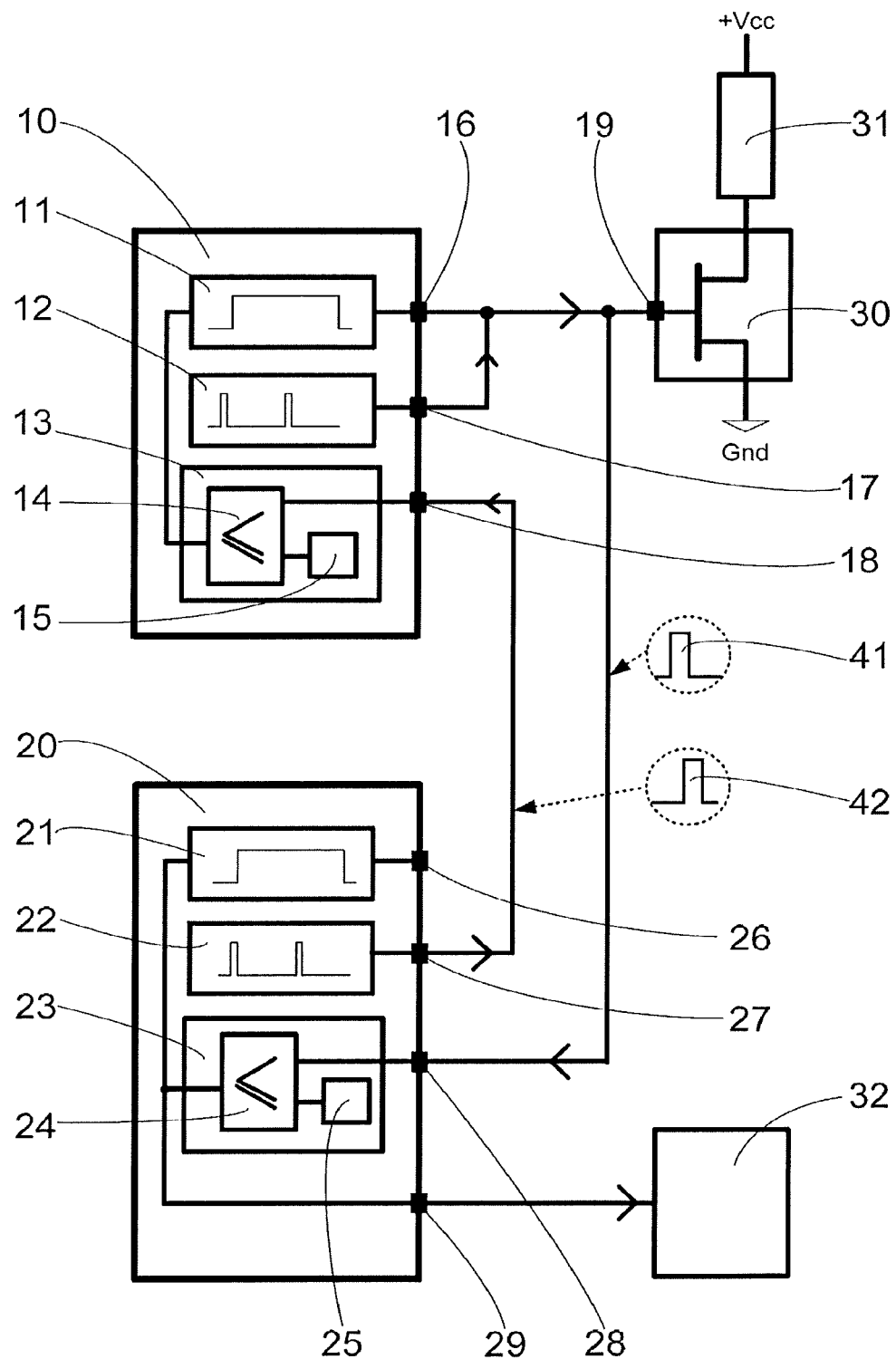

FIG. 2 represents a variant of the monitoring device of an electric trip unit according to a second embodiment making it possible to monitor the connection between the first control output 16 and the input 19 of the first actuator control circuit 30. The first activity output 17 is connected to the first control output 16, and the second input 28 is connected to the control input 19 of the first control circuit 30. Thus, the first activity signal 41, sent by the first activity-indicating circuit 12, runs over the connection between the first control output 16 and the input 19 of the first actuator control circuit 30. Any break of said connection will be detected by the second monitoring circuit 23 since said second circuit will no longer receive the first activity signal 41. In this way, an ongoing verification of the connection between the first control output 16 and the input 19 of the first actuator control circuit 30 is performed with no additional circuit or particular processing of the activity signal 41. The connection between the first activity output 17 and the first control output 16 can be produced either outside of the processing unit 10 as represented in FIG. 2, or in the processing unit 10.

Figure 3:
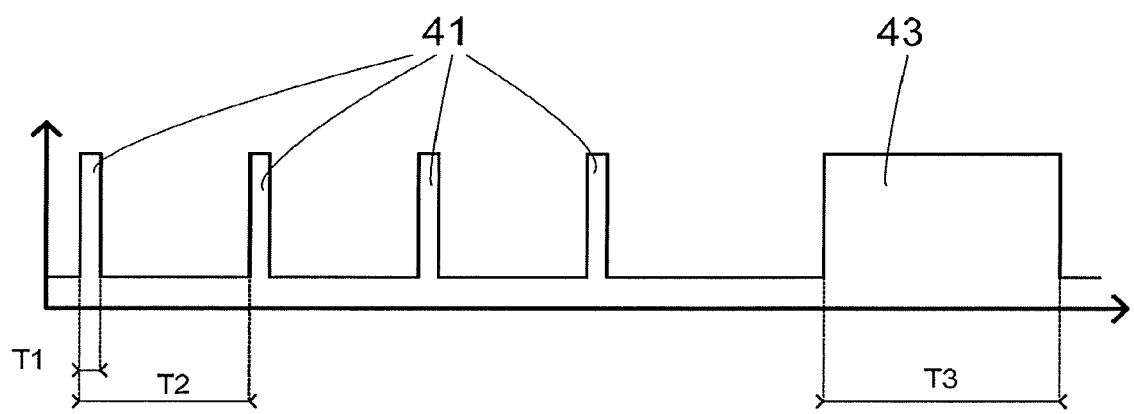
FIG. 3 illustrates a waveform of an activity signal sent by a processing unit as well as an activation wave of a tripping circuit.

To avoid having the first activity signal 41 activate the actuator control circuit 30, the duration T1 of the first activity signal 41 is substantially shorter than the time T3 needed to activate the first actuator control circuit 30. FIG. 3 illustrates a waveform of the first activity signal 41 and an activation wave 43 of the first actuator control circuit. Preferentially, T1 is between 1 and 10 μs. The sending period T2 is preferentially less than or equal to 10 ms, so as to be able to react, for example, in a time less than the minimum response time of a protection function stipulated by the IEC61508 standard. The duration of the second activity signal 42 in the configuration illustrated by FIG. 1 or 2 has no influence since it has no possible effect on the first actuator control circuit 30. The activation of the actuator 31 requires a pulse 43 of duration T3 preferentially greater than 500 μs, lying between 1 ms and 2 ms in the embodiments described by the invention. Since T1 is significantly shorter than T3, the first activity signal 41 cannot originate the activation of the actuator control circuit 30.

Figure 4:
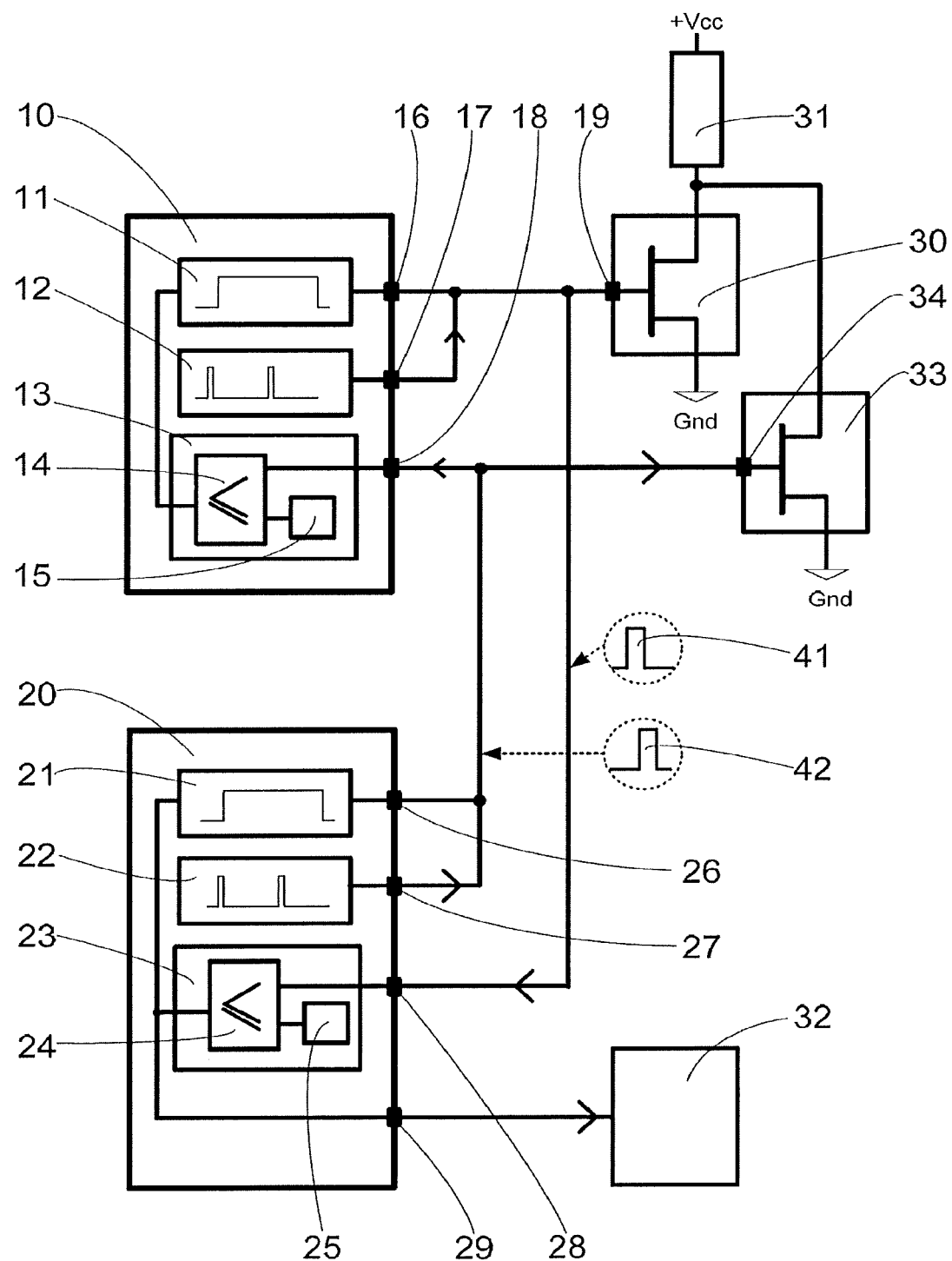
FIG. 4 represents a diagram of the monitoring device according to a preferential embodiment making it possible to increase the dependability and speed of response to a failure of the electric trip unit compared to the first embodiment.

In the case of a failure of the first processing unit 10, the second processing unit 20 activates the control auxiliary 32. The response time of said auxiliary can be deemed too long in light of the risk provoked by the failure of the first processing unit 10. It is possible to increase the dependability of the monitoring device and the speed of response to a failure by adding a second actuator control circuit 33 according to a preferential embodiment of the invention represented in FIG. 4. The second actuator control circuit 33 is connected in parallel to the first control circuit 30. Said second control circuit 33 is linked to the actuator 31 to activate the actuator when said circuit receives a command on a control input 34. The control input 34 is linked to the second input 18, said second input 18 being linked to the second activity output 27. In a way identical to the first processing unit 10, the second control output 26 of the second tripping circuit 21 is linked to the control input 34 of the second control circuit 33. The connection between the second activity output 27 and the second control output 26 can be produced either outside the processing unit 20 as represented in FIG. 4, or in the processing unit 20. Thus, in case of failure of the first processing unit, the second monitoring circuit 23 activates the second tripping circuit 21 and said second tripping circuit 21 in turn activates a command of the actuator 31 by means of the circuit 33. The speed of response to a failure of the first processing unit is thus increased, the setting of the electric trip unit to safety position is very rapid.

Figure 5:
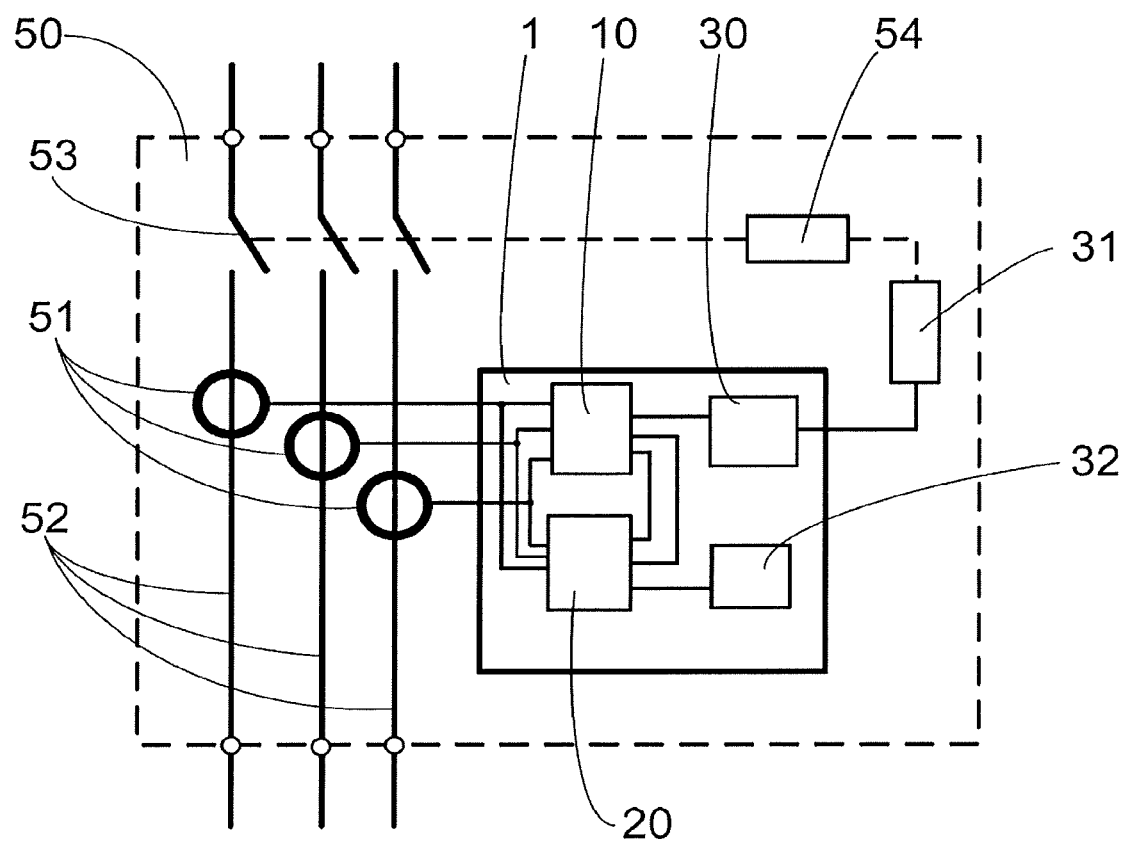
FIG. 5 is a schematic representation of a circuit-breaker comprising an electric trip unit incorporating a monitoring device according to the invention.

The monitoring device of the invention is intended preferentially to monitor the operation of a trip unit 1 installed in an electrical protection apparatus of circuit-breaker type. A circuit-breaker is a protection apparatus used in an electrical energy distribution installation to ensure the protection of the installation against overloads of electrical nature, short-circuits or insulation faults. FIG. 5 is a schematic representation of a circuit-breaker 50 comprising a trip unit 1 incorporating a monitoring device according to the invention. The circuit-breaker 50 is generally installed on a three-phase electrical energy distribution network and comprises three current conductors 52, a current conductor corresponding to a phase of the electrical network. A fourth current conductor can be used as neutral conductor. A current sensor 51 supplies a signal representative of the current circulating in each current conductor 52. A trip unit 1 comprises at least one first and one second processing units 10, 20 connected to said current sensors 51 and suitable for receiving at least one signal representative of the current circulating in each of the current conductors 51. In a variant not represented in FIG. 5, the first or the second processing unit 10, 20 can be connected to the current conductors 52 to measure the voltage between current conductors in order to be able to calculate the power and/or the electrical energy circulating in the installation. The contacts 53 of the circuit-breaker 50 are actuated by a mechanism for opening and closing the electrical contacts 54. Said mechanism is actuated by the actuator 31. Thus, in case of overcurrent Icc in one of the current conductors, the trip switch 1 activates the control circuit 30 in order to command the opening of the electrical circuit by means of the actuator 31. The fault is thus eliminated.

A circuit-breaker is a safety member, its operation has to be dependable. Thus, a monitoring device as described in the invention provides an additional level of dependability in the electrical installation by signalling or by powering down the electrical installation in case of a fault internal to the circuit-breaker, preventing the circuit-breaker from fulfilling its protection functions. The monitoring device described uses little in the way of resources in each processing unit and its cost is low, it is therefore particularly suited to an industrial installation. Also, the operation of the monitoring device adds very little strain to the operation of the processing units, it can be used in any type of electrical equipment: protection relay, programmable logic controller, control apparatus, supervision apparatus, manufacturing machine, apparatus operating in a hazardous environment or exhibiting risks for goods or people and, more generally, any equipment requiring a first level of dependability.

Figure 6:
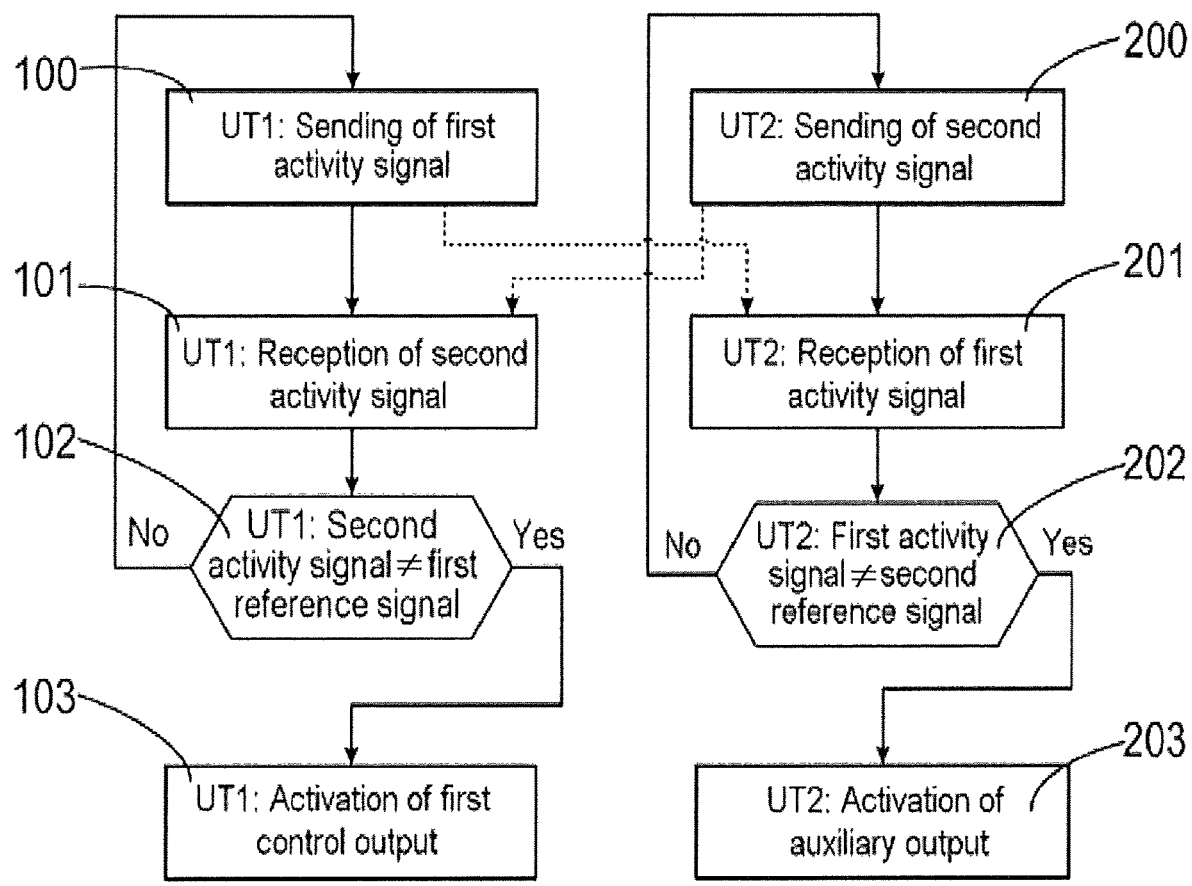
FIG. 6 represents a flow diagram illustrating the operation of the monitoring method according to the first embodiment of the invention.

The invention relates also to a method for monitoring the operation of an electric trip unit. FIG. 6 represents a flow diagram illustrating the operation of the monitoring method according to the embodiments of the invention represented in FIG. 1 and in FIG. 2.

The method comprises a step of sending 100 by the first processing unit 10 of the first activity signal 41. In parallel, synchronously or asynchronously, the second processing unit 20 sends the second activity signal 42 during a step 200. The method then comprises the following steps:
  step of reception 101 by the first processing unit 10 of the second activity signal 42, and, in parallel,
  step of reception 201 by the second processing unit 20 of the first activity signal 41.

Each processing unit will proceed, for its part, to process the activity signal which it has received:
  the first processing unit 10 performs, during the step 102, a comparison of the second activity signal 42 received with the first reference signal 15, and when the second activity signal 42 is different from the first reference signal 15, activates the first control output 16 of the actuator during the step 103. If the second activity signal 42 is identical to the first reference signal 15, return to the step of sending 100 of the first activity signal, and
  the second processing unit 20 performs, during the step 202, a comparison of the first activity signal 41 received with the second reference signal 25, and when the first activity signal 41 is different from the second reference signal 25, activates the auxiliary output 29 during the step 203. If the first activity signal 41 is identical to the second reference signal 25, return to the step of sending 200 of the second activity signal.

It can be seen that the steps 100, 101, 200 and 201 are linked together, thus illustrating the mutual monitoring exercised by each processing unit on the other processing unit. Depending on whether the failure originates from the first or the second processing unit, a different member will be activated: the first control output 16 activates the actuator 31 if the second processing unit 20 is failing, the control auxiliary 32 will be activated if the first processing unit 10 is failing.

Figure 7:
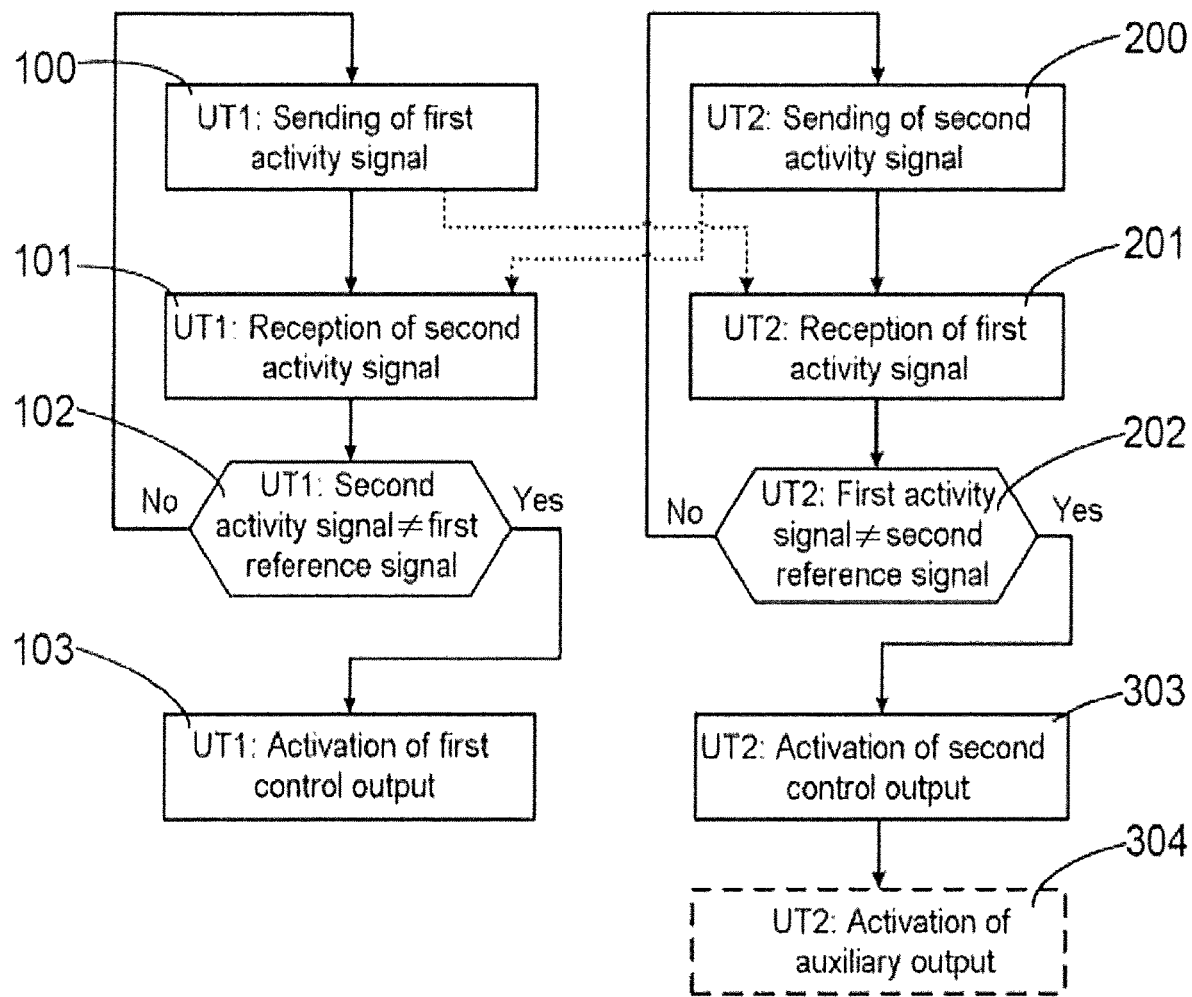
FIG. 7 represents a flow diagram illustrating the operation of the monitoring method according to the preferred embodiment of the invention.

FIG. 7 represents a flow diagram illustrating the operation of the monitoring method according to the preferential embodiment represented in FIG. 4.

The steps of the method 100 to 103 and 200, 201 and 202 are identical to the steps described in FIG. 6. On the other hand, when the first activity signal 41 is different from the second reference signal 25, the second processing unit activates the second control output 26 during the step 303. Optionally, during a step 304, the second processing unit activates the control auxiliary 32 making it possible to signal the failure for example, by means of an indicator lamp or a means of communication to a supervision system.

The invention claimed is:
1. A device to monitor the activity of at least one first and one second processor fitted to an electric trip unit, the first processor comprising a first activity-indicating circuit sending a first activity signal on a first activity output,
wherein:
the first processor further comprises,
a first tripping circuit including a first control output, an output of the first activity-indicating circuit being connected to the first control output,
a first input to receive a second activity signal, and
a first monitoring circuit, connected to the first input, to monitor activity of the second processor, and
the second processor comprises:
a second input to receive the first activity signal,
a second activity-indicating circuit sending the second activity signal on a second activity output, and
a second monitoring circuit, connected to the second input, to monitor activity of the first processor.

2. The monitoring device according to claim 1, wherein the first monitoring circuit compares the second activity signal received on the first input with a first reference signal and activates the first tripping circuit when the second activity signal is different from the first reference signal.

3. The monitoring device according to claim 2, wherein the first control output of the first tripping circuit is connected to a control input of a first actuator control circuit to activate said first actuator control circuit.

4. The monitoring device according to claim 1, wherein the second monitoring circuit compares the first activity signal received on the second input with a second reference signal and activates an auxiliary output when the first activity signal is different from the second reference signal.

5. The monitoring device according to claim 3, wherein:
the second input is connected to the control input of the first actuator control circuit to receive the first activity signal.

6. The monitoring device according to claim 3, wherein a second actuator control circuit connected in parallel with the first actuator control circuit and wherein the second processor comprises a second tripping circuit, connected to the second actuator control circuit, to activate said second actuator control circuit.

7. The monitoring device according to claim 6, wherein the second activity output is connected to the second actuator control circuit.

8. The monitoring device according to claim 7, wherein the second monitoring circuit compares the first activity signal received on the second input with the second reference signal and activates the second tripping circuit when the first activity signal is different from the second reference signal.

9. The monitoring device according to claim 1, wherein the duration of the first activity signal or of the second activity signal is shorter than the duration of the activation signal of the first actuator control circuit or of the second actuator control circuit.

10. The monitoring device according to claim 9, wherein the duration of the first activity signal or of the second activity signal is between 1 and 10 µs and that the period between two consecutive activity signals is substantially equal to 10 ms.

11. A circuit-breaker intended to protect an electrical installation comprising:
current sensors configured to deliver a signal representative of a current circulating in current conductors,
electrical contacts,
a contact opening mechanism,
a tripping actuator to actuate the contact opening mechanism, and
the electric trip unit comprising the first processor and the second processor, the electric trip unit being connected to the current sensors and to the actuator to supply a trip command as a function of the signal delivered by the current sensors, wherein the electric trip unit comprises a device configured to monitor the activity of the processors according to claim 1.

12. The circuit-breaker according to claim 11, wherein in the electric trip unit:
the first processor activates the first tripping circuit when the signal representative of the current circulating in the current conductors exceeds a determined overcurrent threshold, and
the second processor performs power and/or energy computations.

13. A method for monitoring the activity of at least one first processor and one second processor configured to operate an electric trip unit comprising an activity monitoring device, the method comprising:
sending by the first processor, a first activity signal via a control output used to control a first actuator control circuit,
receiving by the first processor a second activity signal, and, in parallel,
receiving by the second processor the first activity signal,
sending by the second processor the second activity signal,
comparing the second activity signal received by the first processor with a first reference signal, and
activating a first control output of an actuator when the second activity signal is different from a first reference signal, otherwise repeat the sending by the first processor, the receiving by the first processor, the sending by the second processor, the receiving by the second processor, and the comparing.

14. The method for monitoring the operation of an electric trip unit according to claim 13, comprising:
comparing the first activity signal received by the second processor with a second reference signal,
activating an auxiliary output when the first activity signal is different from the second reference signal.

15. The method for monitoring the operation of an electric trip unit according to claim 14, comprising:
activating a second control output when the first activity signal is different from the second reference signal.

* * * * *